United States Patent
Poyhonen

(10) Patent No.: US 10,312,794 B2
(45) Date of Patent: Jun. 4, 2019

(54) CHOPPER ASSEMBLY AND CONTROLLING METHOD THEREOF

(71) Applicant: ABB Beijing Drive Systems Co., Ltd., Beijing (CN)

(72) Inventor: Simo Poyhonen, Helsinki (FI)

(73) Assignee: ABB Beijing Drive Systems Co., Ltd., Beijing (CN)

( * ) Notice: Subject to any disclaimer, the term of this patent is extended or adjusted under 35 U.S.C. 154(b) by 0 days.

(21) Appl. No.: 15/992,991

(22) Filed: May 30, 2018

(65) Prior Publication Data
US 2018/0278142 A1   Sep. 27, 2018

Related U.S. Application Data

(63) Continuation of application No. PCT/CN2015/096255, filed on Dec. 3, 2015.

(51) Int. Cl.
  *H02M 1/14*   (2006.01)
  *H02M 3/158*   (2006.01)

(52) U.S. Cl.
  CPC ...... *H02M 1/14* (2013.01); *H02M 2003/1586* (2013.01)

(58) Field of Classification Search
  CPC ........... H02M 1/14; H02M 2003/1586; H02M 2001/0003; H02M 3/156; H02M 3/158;
  (Continued)

(56) References Cited

U.S. PATENT DOCUMENTS

| 8,670,258 B2 * | 3/2014 | Daigo | H02M 3/1584 363/124 |
| 2001/0006342 A1 * | 7/2001 | Kusumoto | H02M 3/155 323/355 |

(Continued)

FOREIGN PATENT DOCUMENTS

| CN | 101615884 A | 12/2009 |
| CN | 202334440 U | 7/2012 |

(Continued)

OTHER PUBLICATIONS

State Intellectual Property Office of the P.R. China, International Search Report & Written Opinion issued in corresponding Application No. PCT/CN2015/096255, dated Aug. 23, 2016, 11 pp.

*Primary Examiner* — Timothy J. Dole
*Assistant Examiner* — Shahzeb K Ahmad
(74) *Attorney, Agent, or Firm* — J. Bruce Schelkopf; Taft Stettinius & Hollister LLP

(57) ABSTRACT

A chopper assembly including at least two chopper units, and a controlling unit configured to generate a control signal for controlling an activation of the corresponding chopper unit in cycle. The activations of the at least two chopper units are controlled by the controlling unit to be either initially offset by a phase shift or adjusted to have a phase shift after a predefined time duration, the phase shift indicating a time difference between rising edges or between falling edges of respective pulses of different signals. The chopper assembly according to the present disclosure effectively mitigates the negative impact to various components within the circuit. Moreover, by controlling the duty cycles of the control signals, loads of each of the resistors will be equal.

18 Claims, 2 Drawing Sheets

(58) Field of Classification Search
CPC ...... H02M 3/1584; H02M 7/155; H02M 7/21; H02M 7/217; H02M 7/08
See application file for complete search history.

(56) References Cited

U.S. PATENT DOCUMENTS

| | | | |
|---|---|---|---|
| 2009/0134855 A1* | 5/2009 | Landwehr | H02M 3/1584 323/272 |
| 2015/0311831 A1* | 10/2015 | Yamada | H02J 7/0063 318/139 |
| 2016/0087547 A1* | 3/2016 | Yamada | H02M 1/12 318/400.3 |
| 2017/0093284 A1* | 3/2017 | Suekawa | H02M 3/158 |
| 2017/0229978 A1* | 8/2017 | Ayai | H02M 3/155 |

FOREIGN PATENT DOCUMENTS

| | | |
|---|---|---|
| EP | 1434337 A1 | 6/2004 |
| JP | H08228475 A | 9/1996 |

\* cited by examiner

CHOPPER ASSEMBLY AND CONTROLLING METHOD THEREOF

TECHNOLOGY

Example embodiments disclosed herein generally relate to a chopper assembly and a controlling method of the chopper assembly, and more specifically, to a chopper assembly and its controlling method to lower the amplitude of a ripple current through a DC link.

BACKGROUND

In a variable-frequency drive system, a DC bus voltage will increase if inverters are controlled in a way that energy flows from motors to DC links. Excessive DC bus voltage may be harmful to rectifier and inverter components, especially to capacitors within the circuits. As a result, the DC bus voltage may need to be limited below a threshold so as to avoid failures of various components.

One way to limit the DC bus voltage is to lead a portion of energy to a resistor associated with a braking chopper. The resistor is used to convert the portion of energy into heat, so that the excessive portion of the DC bus voltage may be biased to the resistor and thus various components can be protected.

When more than one braking chopper is involved, a method to control the operations of these braking choppers may be needed. The braking chopper can also be referred to as a chopper unit. One existing method is to control the chopper units individually, which may cause large difference in the chopper unit and resistor load share by small inaccuracies in a measurement circuit having analog components. Another existing method is to set one master chopper unit and additional chopper unit(s), with all of the chopper units being operated simultaneously. By utilizing this method, all of the chopper units may fail to function if the master chopper unit fails. In addition, a high current pulse may occur, which in turn negatively impacts the components connected to the DC link (e.g., in the form of additional thermal stress, distribution to controllers, and the like), because all of the chopper units are switched on and off at the same time. The high current pulses caused by the activations of the chopper units are represented as DC link ripple current, which is the AC component of the current through a capacitor of the DC link (or can be referred to as a DC capacitor).

In view of the foregoing, there is a need in the art for a solution for controlling the chopper units so as to lower the amplitude of the ripple current when the chopper units are activated.

SUMMARY

Example embodiments disclosed herein propose a chopper assembly and a controlling method thereof for minimizing the ripple current.

In one aspect, example embodiments disclosed herein provide a chopper assembly. The chopper assembly includes at least two chopper units; and a controlling unit configured to generate a control signal for controlling an activation of the corresponding chopper unit in cycle. The activations of the at least two chopper units are controlled by the controlling unit to be either initially offset by a phase shift or adjusted to have a phase shift after a predefined time duration. The phase shift is indicative of a time difference between rising edges or between falling edges of respective pulses of different signals.

In one embodiment, each of the chopper units may include a controlling unit, and the controlling unit may include a reference unit configured to generate a reference signal and a phase controlling unit configured to control the phase shift of the control signal. The phase controlling unit of at least one of the chopper units may be configured to control the phase shift of the control signal for the corresponding chopper unit based on the reference signal for the corresponding chopper unit and the control signal for a different chopper unit.

In one embodiment, the controlling units of the at least two chopper units may be connected in an open-loop form, and the phase controlling unit may be configured to control the phase shift of the control signal for the corresponding chopper unit based on the reference signal for the corresponding chopper unit and the control signal for an adjacent chopper unit.

In another embodiment, the controlling units of the at least two the chopper units may be connected in a closed-loop form, and the phase controlling unit may be configured to control the phase shift of the control signal for the corresponding chopper unit based on the reference signal for the corresponding chopper unit and the control signal for an adjacent chopper unit. Additionally or alternatively, the at least two chopper units may be arranged such that the chopper units are connected in an open-loop form in response to one of the chopper units being out of function.

In a further embodiment, the controlling unit may further include a duty cycle controlling unit configured to control a duty cycle of the control signal for the corresponding chopper unit based on the reference signal for the corresponding chopper unit and the control signal for an adjacent chopper unit, and the duty cycle is indicative of a ratio of a duration of time for one pulse of a signal to a time difference between two adjacent pulses of the signal.

In yet another embodiment, the chopper assembly may further include a counting unit configured to count the number of the chopper units, and a phase shift preset unit configured to preset the phase shift among the respective reference signals for different chopper units based on the counted number of the chopper units.

In another aspect, example embodiments disclosed herein provide a method of controlling a chopper assembly. The chopper assembly includes at least two chopper units. The method includes: generating a control signal for each of the at least two chopper units in order to control an activation of the corresponding chopper unit in cycle; and controlling the activations of the at least two chopper units to be either initially offset by a phase shift or adjusted to have a phase shift after a predefined time duration. The phase shift is indicative of a time difference between rising edges or between falling edges of respective pulses of different signals.

In one embodiment, the method may further include generating a reference signal for each of the at least two chopper units; and controlling the phase shift of the control signal for the corresponding chopper unit based on the reference signal for the corresponding chopper unit and the control signal for a different chopper unit.

In one embodiment, controlling the phase shift may further include controlling the phase shift of the control signal for the corresponding chopper unit based on the reference signal for the corresponding chopper unit and the control signal for an adjacent chopper unit, the at least two chopper units being connected in an open-loop form.

In another embodiment, controlling the phase shift may further include controlling the phase shift of the control signal for the corresponding chopper unit based on the reference signal for the corresponding chopper unit and the control signal for an adjacent chopper unit, the at least two chopper units being connected in a closed-loop form. Additionally or alternatively, the at least two chopper units may be arranged such that the chopper units are connected in an open-loop form in response to one of the chopper units being out of function.

In a further embodiment, the method may further include controlling a duty cycle of the control signal for the corresponding chopper unit based on the reference signal for the corresponding chopper unit and the control signal for an adjacent chopper unit, and wherein the duty cycle is indicative of a ratio of a duration of time for one pulse of a signal to a time difference between two adjacent pulses of the signal.

In yet another embodiment, the method may further include counting the number of the chopper units; and presetting the phase shift among the respective reference signals for different chopper units based on the counted number of the chopper units.

Through the following description, it would be appreciated that the phase shifts of the control signals for controlling the switching on/off of various chopper units can be activated non-simultaneously so that current pulses of various choppers will be shifted and total current (being equal to total sum of all various choppers current) pulse maximum value will be decreased. As a result, the negative impact to various components within the circuit is mitigated. Moreover, by controlling the duty cycles of the control signals, loads of each of the resistors will be equal.

DESCRIPTION OF DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DESCRIPTION OF EXAMPLE EMBODIMENTS

Figure 1:
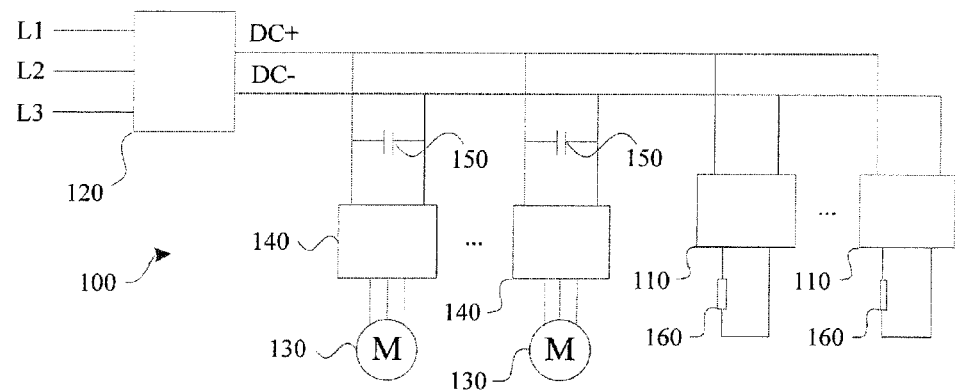
FIG. 1 illustrates an environment where a chopper assembly can be used in a variable-frequency drive system in accordance with an example embodiment.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "includes" and its variants are to be read as open terms that mean "includes, but is not limited to." The term "or" is to be read as "and/or" unless the context clearly indicates otherwise. The term "based on" is to be read as "based at least in part on." The term "one embodiment" and "an embodiment" are to be read as "at least one embodiment." The term "another embodiment" is to be read as "at least one other embodiment." Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 1-4. Other definitions, explicit and implicit, may be included below.

FIG. 1 illustrates an environment where a chopper assembly 110 can be used in a variable-frequency drive system 100 in accordance with an example embodiment. The variable-frequency drive system 100 includes a rectifier 120 with three AC inputs. The rectifier 120 will convert the AC inputs into DC current on two lines so as to power up a motor 130 via a corresponding inverter 140. The inverter can be crossed over the two lines. The system 100 is able to power up multiple motors 130 with respective inverters 140. A DC capacitor 150 can be crossed over the two lines functioning as a DC link. As described above, the system 100 may include at least one braking chopper or chopper unit 110. Each of the chopper unit 110 is crossed over the two lines for receiving DC current. In addition, a braking resistor 160 is connected to each of the chopper unit 110 for dissipating heat generated the current. Each of the chopper units can be controlled for intentional voltage control, and thus the quality of the DC current (for example, pattern of spectrum, ripple current, etc.) on the two lines can be optimized.

All of the components and the modules shown in FIG. 1 are existing and well known in the industry, and thus detailed explanations thereof are omitted. It is to be noted that the number of inverters, motors, chopper units or braking resistors is not to be limited by the present disclosure.

In one example embodiment as described herein, a chopper assembly may include a number of chopper units 110. A controlling unit is also provided, which may be configured to generate a control signal for controlling an activation of the corresponding chopper unit 110 in cycle. The activations of the at least two chopper units 110 are controlled by the controlling unit to be either initially offset by a phase shift or adjusted to have a phase shift after a predefined time duration. The phase shift indicates a time difference between rising edges or between falling edges of respective pulses of different signals. By this configuration, the chopper units can be activated at different moments, thereby a large impulse in the resulting current induced by simultaneous activations of the chopper units is prevented.

Figure 2:
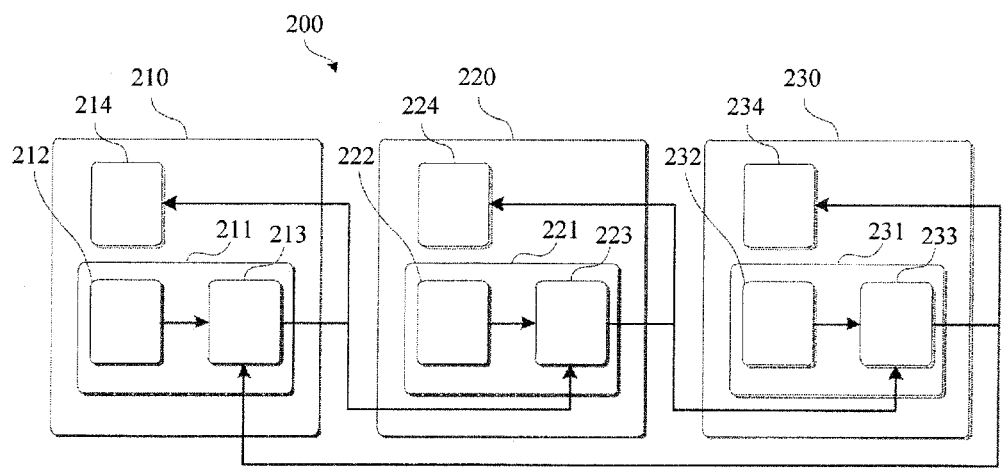
FIG. 2 illustrates a schematic diagram of the chopper assembly in which a number of chopper units are connected in a closed-loop form in accordance with one example embodiment.

FIG. 2 illustrates a schematic diagram of a chopper assembly 200 in which a number of chopper units 210, 220, 230 are connected in a closed-loop form in accordance with one example embodiment.

In this embodiment shown by FIG. 2, the chopper unit 210 may include a controlling unit 211 and a switch 214. The controlling unit 211 is used for generating a control signal used to control the activation of the switch 214. As can be seen in FIG. 1, the activation of the switch 214 causes a corresponding braking chopper 110 to function, and thus a corresponding braking resistor 160 operates to generate heat in response to an incoming current flown through.

The control signal generated by the controlling unit 211 may be a pulsed signal with a value of duty cycle. The duty cycle is indicative of a ratio of a duration of time for one pulse of the control signal to a time difference between two adjacent pulses of the control signal. If the duration of a pulse is represented by T, and a period between two adjacent pulses is represented by P, the duty cycle can be represented by D=(T/P)*100% or simply D=T/P. The control signal is input to the switch 214 within the same chopper unit 210.

As shown, the controlling unit 211 also includes a reference unit 212 and a phase controlling unit 213. The reference unit 212 can be used to generate a reference signal to be input to the phase controlling unit 213. The reference signal can be later used to generate the control signal by the phase controlling unit 213.

In this embodiment, three chopper units 210, 220 and 230 are shown. The chopper units 220 and 230 have same configurations and functions compared with the chopper unit 210. Specifically, the chopper unit 220 includes a switch 224, a controlling unit 221 having a reference unit 222 and a phase controlling unit 223; and the chopper unit 230 includes a switch 234, a controlling unit 231 having a reference unit 232 and a phase controlling unit 233. However, it should be appreciated that the number of chopper unit is not to be limited, as what has been discussed with respect to FIG. 1.

In the embodiment shown by FIG. 2, the phase controlling unit 213 relies on two inputs, one from the reference unit 212 carrying the reference signal for the chopper unit 210, while the other from the phase controlling unit 233 carrying the control signal for the chopper unit 230. In other words, the generation of the control signal from the controlling unit 211 is based on both the reference signal from the reference unit 212 as well as the control signal from the phase controlling unit 233. Likewise, the generation of the control signal from the controlling unit 221 is based on both the reference signal from the reference unit 222 as well as the control signal from the phase controlling unit 213; and the generation of the control signal from the controlling unit 231 is based on both the reference signal from the reference unit 232 as well as the control unit from the phase controlling unit 223. In this form, the controlling units 211, 221, 231 of the three chopper units 210, 220, 230 are connected in a closed-loop form.

The reference signals from the reference unit 212, 222, 232 may have a phase shift between each other. The phase shift is indicative of a time difference between rising edges or between falling edges of respective pulses of different signals. For example, if the period $P_1$ of a signal 1 is equal to the period $P_2$ of a signal 2, also the time difference between rising edges of respective pulses of the signals 1 and 2 is represented by $\Delta t$, the phase shift in degrees can be represented by $(\Delta t/P_1)*360°$. Therefore, the phase controlling units 213, 223, 233 generate the control signals with a phase shift between either two of the three signals. As a result, non-simultaneously switching of various chopper units mitigates the AC component of the DC-link current, maximizing the performance of ripple current reduction.

Figure 3:
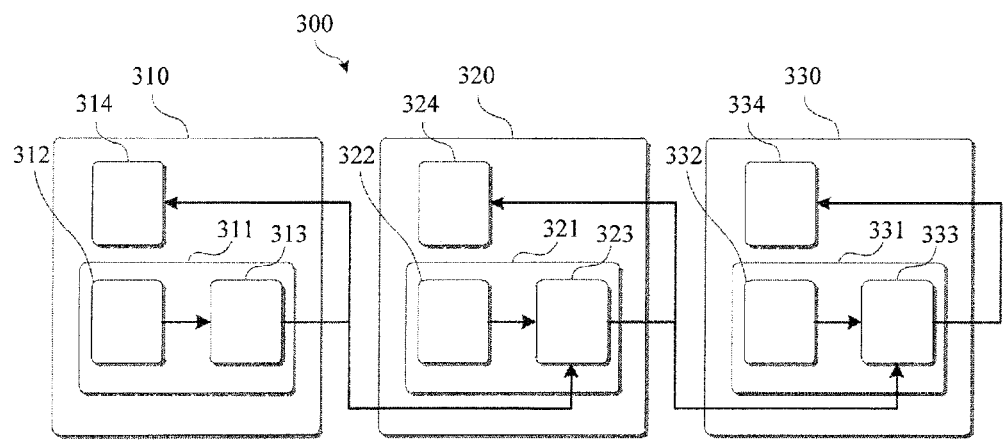
FIG. 3 illustrates a schematic diagram of the chopper assembly of FIG. 2 in which a number of chopper units are connected in an open-loop form.

FIG. 3 illustrates a schematic diagram of a chopper assembly 300 in which a number of chopper units 310, 320, 330 are connected in an open-loop form.

In this embodiment, the chopper units 310, 320, 330 have same configurations and functions compared with each of the chopper units shown in FIG. 2. Specifically, the chopper unit 310 includes a switch 314, a controlling unit 311 having a reference unit 312 and a phase controlling unit 313; the chopper unit 320 includes a switch 324, a controlling unit 321 having a reference unit 322 and a phase controlling unit 323; and the chopper unit 330 includes a switch 334, a controlling unit 331 having a reference unit 332 and a phase controlling unit 333. However, it should be appreciated that the number of chopper unit is not to be limited, as what has been discussed with respect to FIGS. 1 and 2.

The embodiment shown by FIG. 3 differs from the embodiment shown by FIG. 2 in that the output of the phase controlling unit 333 is not returning to the phase controlling unit 313. In this form, the controlling units 311, 321, 331 of the three chopper units 310, 320, 330 are connected in an open-loop form. An open-loop connection can be turned into a closed-loop connection with each of the controlling units depending on its previous (or next) controlling unit (connected in circle). On the other hand, a closed-loop connection can be turned into an open-loop connection if one of the controlling units is out of function.

Figure 4:
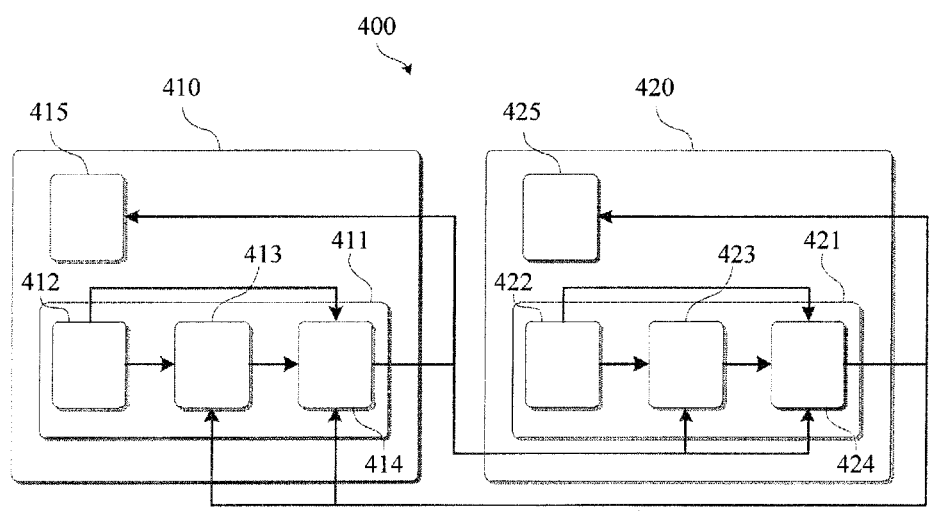
FIG. 4 illustrates a schematic diagram of the chopper assembly in which a number of chopper units are connected in a closed-loop form in accordance with another example embodiment.

FIG. 4 illustrates a schematic diagram of the chopper assembly 400 in which a number of chopper units 410, 420 are connected in a closed-loop form in accordance with another example embodiment.

In this embodiment shown by FIG. 4, the chopper unit 410 may include a controlling unit 411 and a switch 415. The controlling unit 411 is used for generating a control signal used to control the activation of the switch 415. As can be seen in FIG. 1, the activation of the switch 415 causes a corresponding braking chopper 110 to function, and thus a corresponding braking resistor 160 operates to generate heat in response to an incoming current flown through.

The control signal generated by the controlling unit 411 may be a pulsed signal with a value of duty cycle. The control signal is input to the switch 415 within the same chopper unit 410.

As shown, the controlling unit 411 also includes a reference unit 412, a duty cycle controlling unit 413 and a phase controlling unit 414. The reference unit 412 can be used to generate a reference signal to be input to the duty cycle controlling unit 413.

In this embodiment, two chopper units 410, 420 are shown. The chopper unit 420 has the same configuration and function compared with the chopper unit 410. Specifically, the chopper unit 420 includes a switch 425, a controlling unit 421 having a reference unit 422, a duty cycle controlling unit 423 and a phase controlling unit 424. However, it should be appreciated that the number of chopper unit is not to be limited, as what has been discussed with respect to FIGS. 1 and 2.

In the embodiment shown by FIG. 4, the duty cycle controlling unit 413 relies on two inputs, one from the reference unit 412 carrying the reference signal for the chopper unit 410, while the other from the phase controlling unit 424 carrying the control signal for the chopper unit 420. In other words, the duty cycle controlling unit 413 is used to adjust the duty cycle of the received reference signal based on the control signal from another chopper assembly. Then, the generation of the control signal from the phase controlling unit 414 is based on both the adjusted reference signal from the duty cycle controlling unit 413 as well as the control signal from the phase controlling unit 424. Likewise, the duty cycle controlling unit 423 is used to adjust the duty cycle of the received reference signal from the reference unit 422 based on the control signal from the chopper assembly 410, and the generation of the control signal from the phase controlling unit 424 is based on both the adjusted reference signal from the duty cycle controlling unit 423 as well as the control signal from the phase controlling unit 414. In this form, the controlling units 411, 421 of the two chopper units 410, 420 are connected in a closed-loop form.

The reference signals from the reference unit 412, 422 may have a phase shift between each other. Therefore, the phase controlling units 414, 424 generate the control signals with a phase shift between the two signals. As a result, non-simultaneously switching of various chopper units mitigates the AC component of the DC-link current, maximizing the performance of ripple current reduction.

Because variations on duty cycles of different control signals may cause unequal losses to the chopper units as well as the braking resistors, the duty cycle controlling units synchronizing duty cycles among different signals may be useful to lower additional losses. In other words, one duty cycle controlling unit is used to control the duty cycle of the control signal to a similar value compared with the control signal of another chopper unit, such that power losses for the chopper unit and the braking resistor can be balanced.

In the following descriptions, simulation results are provided for illustrating the performance of the chopper assembly in accordance with the example embodiments.

As discussed previously, the ripple of a current may be considered as the AC component of a DC-link current. If all of the chopper units are to be switched on simultaneously, the generated ripple would have a largest amplitude, which can be calculated by (assuming the duty cycle is 0.5) $I_{rms}=(U_{DC}/R)*N/2$. $U_{DC}$ represents an average DC voltage during operation, R represents the resistance of the braking resistor, and N represents the number of chopper units and resistors. Therefore, one of our objectives is to lower the amplitude of such a ripple when switched simultaneously.

For example, if the control signals for two chopper units are synchronized to have a 180° phase shift, a reduction factor of 0.5 can be obtained, which may be the optimum reduction. The reduction factor represents how much the ripple current will be decreased compared with the situation when all chopper units are switched on/off simultaneously (for example, the reduction factor of 0.5 means that the ripple current will be 50% of $I_{rms}$). Table 1 shows a set of ideal phase shift values for different number of chopper units and their corresponding reduction factors.

TABLE 1

|  | Number of chopper units | | |
| --- | --- | --- | --- |
|  | 2 | 3 | 4 |
| Phase shift | 180° | 120° | 90° |
| Reduction factor | 0.5 | 0.33 | 0.25 |

In principle, the ripple current will be reduced by a factor 1/N if the number of chopper units (N) increases. In addition, the ideal phase shift between the chopper units can be simply calculated by 360°/N. However, the number of chopper units may be unknown, and thus the ideal phase shift between the chopper units is not known. By presetting a phase shift value, a number of reduction factors are shown in Table 2 in accordance with their respective number of chopper units.

TABLE 2

|  | Number of chopper units (N) | | |
| --- | --- | --- | --- |
| Preset phase shift | 2 | 3 | 4 |
| 90° | 0.71 | 0.40 | 0.25 |
| 120° | 0.58 | 0.33 | 0.41 |
| 180° | 0.50 | 0.55 | 0.50 |

The comparisons are obtained theoretically and are based on a topology configured in an open-loop form, as can be shown by FIG. 3 for example. From the results shown in Table 2, 2 chopper units with phase shift of 180°, 3 chopper units with phase shift of 120°, 4 chopper units with phase shift of 90° have the best performance in terms of the reduction, just as Table 1 shows. For any of the rest data, the performance is not as good but there is still a considerable reduction in the amplitude of the ripple. In one example embodiment, the number of the chopper units can be automatically counted, and then an optimal phase shift value can be generated based on the counted number, resulting in the quickly lowered reduction factors.

The topology configured in a closed-loop form (as can be shown by FIG. 2 or 4, for example) may have a simulation result, which is shown in Table 3 with a comparison between closed-loop and open-loop configurations.

TABLE 3

| Preset phase shift | Number of chopper units | | | | | |
| --- | --- | --- | --- | --- | --- | --- |
|  | 2 | | 3 | | 4 | |
|  | Closed | Open | Closed | Open | Closed | Open |
| 90° | 0.6 | 0.7 | 0.3 | 0.3 | 0.4 | 0.4 |
| 120° | 0.6 | 0.55 | 0.3 | 0.3 | 0.4 | 0.5 |
| 180° | 0.5 | 0.5 | 0.4 | 0.5 | 0.4 | 0.5 |

It can be observed from the simulation results in Table 3 that the closed-loop configuration normally has a reduction better (with smaller reduction factors) than the open-loop configuration. The closed-loop configuration may adapt the phase shift value over time, until the reduction factor converges or the variation of the reduction factor is smaller than a threshold value.

More chopper units can be applied. In another simulation, 5 chopper units have a reduction factor of 0.2 for the closed-loop configuration and of 0.5 for the open-loop configuration if the phase shift is preset to be 180°. In yet another simulation, 6 chopper units have a reduction factor of 0.2 for the closed-loop configuration and of 0.5 for the open-loop configuration if the phase shift is preset to be 180°. As a result, for most cases with the number of chopper units from 2 to 6, a phase shift value of 180° can be preset to secure a reduction factor of 0.5 at most, for either closed-loop or open-loop configuration. Even a topology with the closed-loop configuration has one of the chopper units out of function, the rest chopper units can automatically form up an open-loop configuration, which also achieves considerable reduction of the amplitude of the ripple current.

Through various embodiments of the present disclosure, the phase shifts of the control signals for controlling the switching on/off of various chopper units can be activated non-simultaneously. As a result, when a number of chopper units are used to control the excessive energy in the system, AC component of the DC-link current is effectively lowered.

Therefore, the negative impact to various components (such as the DC capacitor) within the circuit is mitigated. Moreover, by controlling the duty cycles of the control signals, additional power losses in the chopper unit can be minimized. Additionally or alternatively, by detecting the number of chopper units, an optimal phase shift value can be preset, in order to speed up the stabilization of the ripple current with a maximum reduction.

While operations are depicted in a particular order in the above descriptions, this should not be understood as requiring that such operations be performed in the particular order shown or in sequential order, or that all illustrated operations be performed, to achieve desirable results. In certain circumstances, multitasking and parallel processing may be advantageous. Likewise, while several details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A chopper assembly, comprising:
   at least two chopper units each including a controlling unit configured to generate a control signal for controlling an activation of the corresponding chopper unit in cycle and including:
      a reference unit configured to generate a reference signal, and
      a phase controlling unit configured to control a phase shift of the control signal based on the reference signal for the corresponding chopper unit and the control signal for a different chopper unit,
   wherein the activations of the at least two chopper units are controlled by the controlling units to be either initially offset by the phase shifts or adjusted to have the phase shifts after a predefined time duration, the phase shifts indicating a time difference between rising edges or between falling edges of respective pulses of different signals.

2. The chopper assembly according to claim 1, wherein the controlling units of the at least two chopper units are connected in an open-loop form, and
   wherein the phase controlling unit is configured to control the phase shift of the control signal for the corresponding chopper unit based on the reference signal for the corresponding chopper unit and the control signal for an adjacent chopper unit.

3. The chopper assembly according to claim 2, wherein the controlling unit further comprises:
   a duty cycle controlling unit configured to control a duty cycle of the control signal for the corresponding chopper unit based on the reference signal for the corresponding chopper unit and the control signal for an adjacent chopper unit, and
   wherein the duty cycle is indicative of a ratio of a duration of time for one pulse of a signal to a time difference between two adjacent pulses of the signal.

4. The chopper assembly according to claim 2, further comprising:
   a counting unit configured to count the number of the chopper units; and
   a phase shift preset unit configured to preset the phase shift among the respective reference signals for different chopper units based on the counted number of the chopper units.

5. The chopper assembly according to claim 1, wherein the controlling units of the at least two chopper units are connected in a closed-loop form, and
   wherein the phase controlling unit is configured to control the phase shift of the control signal for the corresponding chopper unit based on the reference signal for the corresponding chopper unit and the control signal for an adjacent chopper unit.

6. The chopper assembly according to claim 5, wherein the at least two chopper units are arranged such that the chopper units are connected in an open-loop form in response to one of the chopper units being out of function.

7. The chopper assembly according to claim 6, wherein the controlling unit further comprises:
   a duty cycle controlling unit configured to control a duty cycle of the control signal for the corresponding chopper unit based on the reference signal for the corresponding chopper unit and the control signal for an adjacent chopper unit, and
   wherein the duty cycle is indicative of a ratio of a duration of time for one pulse of a signal to a time difference between two adjacent pulses of the signal.

8. The chopper assembly according to claim 6, further comprising:
   a counting unit configured to count the number of the chopper units; and
   a phase shift preset unit configured to preset the phase shift among the respective reference signals for different chopper units based on the counted number of the chopper units.

9. The chopper assembly according to claim 5, wherein the controlling unit further comprises:
   a duty cycle controlling unit configured to control a duty cycle of the control signal for the corresponding chopper unit based on the reference signal for the corresponding chopper unit and the control signal for an adjacent chopper unit, and
   wherein the duty cycle is indicative of a ratio of a duration of time for one pulse of a signal to a time difference between two adjacent pulses of the signal.

10. The chopper assembly according to claim 5, further comprising:
    a counting unit configured to count the number of the chopper units; and
    a phase shift preset unit configured to preset the phase shift among the respective reference signals for different chopper units based on the counted number of the chopper units.

11. The chopper assembly according to claim 1, further comprising:
    a counting unit configured to count the number of the chopper units; and
    a phase shift preset unit configured to preset the phase shift among the respective reference signals for different chopper units based on the counted number of the chopper units.

12. A method of controlling a chopper assembly including at least two chopper units, the method comprising:
  generating a control signal for each of the at least two chopper units in order to control an activation of the corresponding chopper unit in cycle;
  controlling the activations of the at least two chopper units to be either initially offset by a phase shift or adjusted to have a phase shift after a predefined time duration, the phase shift indicating a time difference between rising edges or between falling edges of respective pulses of different signals;
  generating a reference signal for each of the at least two chopper units; and
  controlling the phase shift of the control signal for the corresponding chopper unit based on the reference signal for the corresponding chopper unit and the control signal for a different chopper unit.

13. The method according to claim 12, wherein controlling the phase shift further comprises:
  controlling the phase shift of the control signal for the corresponding chopper unit based on the reference signal for the corresponding chopper unit and the control signal for an adjacent chopper unit, the at least two chopper units being connected in an open-loop form.

14. The method according to claim 13, wherein the method further comprises:
  controlling a duty cycle of the control signal for the corresponding chopper unit based on the reference signal for the corresponding chopper unit and the control signal for an adjacent chopper unit, and wherein the duty cycle is indicative of a ratio of a duration of time for one pulse of a signal to a time difference between two adjacent pulses of the signal.

15. The method according to claim 12, wherein controlling the phase shift further comprises:
  controlling the phase shift of the control signal for the corresponding chopper unit based on the reference signal for the corresponding chopper unit and the control signal for an adjacent chopper unit, the at least two chopper units being connected in a closed-loop form.

16. The method according to claim 15, wherein the at least two chopper units are arranged such that the chopper units are connected in an open-loop form in response to one of the chopper units being out of function.

17. The method according to claim 15, wherein the method further comprises:
  controlling a duty cycle of the control signal for the corresponding chopper unit based on the reference signal for the corresponding chopper unit and the control signal for an adjacent chopper unit, and wherein the duty cycle is indicative of a ratio of a duration of time for one pulse of a signal to a time difference between two adjacent pulses of the signal.

18. The method according to claim 12, further comprising:
  counting the number of the chopper units; and
  presetting the phase shift among the respective reference signals for different chopper units based on the counted number of the chopper units.

* * * * *